US009644649B2

(12) United States Patent
Ferraz, Jr. et al.

(10) Patent No.: US 9,644,649 B2
(45) Date of Patent: May 9, 2017

(54) VOID PROTECTION SYSTEM

(71) Applicant: Caterpillar Global Mining LLC, Oak Creek, WI (US)

(72) Inventors: John Ferraz, Jr., Romeoville, IL (US); Brandon Z. Barnes, Oak Creek, WI (US)

(73) Assignee: Caterpillar Global Mining LLC, South Milwaukee, WI (US)

( * ) Notice: Subject to any disclaimer, the term of this patent is extended or adjusted under 35 U.S.C. 154(b) by 456 days.

(21) Appl. No.: 14/213,305

(22) Filed: Mar. 14, 2014

(65) Prior Publication Data

US 2015/0260205 A1 Sep. 17, 2015

(51) Int. Cl.

| | |
|---|---|
| ***F16D 31/02*** | (2006.01) |
| ***F15B 21/04*** | (2006.01) |
| ***E02F 3/42*** | (2006.01) |
| ***E02F 9/22*** | (2006.01) |

(52) U.S. Cl.

CPC ............ *F15B 21/047* (2013.01); *E02F 3/425* (2013.01); *E02F 9/226* (2013.01); *E02F 9/2239* (2013.01); *E02F 9/2285* (2013.01); *E02F 9/2292* (2013.01); *F15B 2211/20576* (2013.01); *F15B 2211/3058* (2013.01); *F15B 2211/30565* (2013.01); *F15B 2211/30575* (2013.01); *F15B 2211/6313* (2013.01); *F15B 2211/6346* (2013.01); *F15B 2211/7053* (2013.01); *F15B 2211/857* (2013.01); *F15B 2211/8609* (2013.01)

(58) Field of Classification Search

CPC . F15B 21/047; F15B 2211/3058; E02F 3/425; E02F 9/2239

USPC .......................................................... 60/430

See application file for complete search history.

(56) References Cited

U.S. PATENT DOCUMENTS

| | | | |
|---|---|---|---|
| 5,960,695 A | 10/1999 | Aardema et al. | |
| 6,619,183 B2 | 9/2003 | Yoshino | |
| 7,194,856 B2 | 3/2007 | Ma et al. | |
| 8,091,355 B2 | 1/2012 | St. Aubin et al. | |
| 2003/0041728 A1 | 3/2003 | Lunzman et al. | |
| 2003/0106315 A1 | 6/2003 | Smith | |
| 2005/0087065 A1 | 4/2005 | Yoshino | |
| 2012/0076628 A1* | 3/2012 | Gilmore ................ | E02F 9/2267 414/687 |

(Continued)

FOREIGN PATENT DOCUMENTS

SE WO 2012161628 A1 * 11/2012 ............ E02F 9/2217

*Primary Examiner* — Thomas E Lazo
*Assistant Examiner* — Daniel Collins

(57) ABSTRACT

A void protection system includes a valve assembly, a second fluid source configured to provide hydraulic fluid to the hydraulic cylinder, an auxiliary valve configured to fluidly connect the hydraulic cylinder to the second fluid source, a sensor assembly, and a controller. The controller is configured to monitor fluid pressure within the hydraulic cylinder based on signals from the sensor assembly, based on a determination that pressure in a rod end or a head end of the hydraulic cylinder is below a first fluid pressure threshold, configure the valve assembly to fluidly connect the corresponding end to the first fluid source, and if the first fluid source is not operational, increase an opening of the auxiliary valve to fluidly connect the corresponding end to the second fluid source and cause the second fluid source to provide fluid until pressure in the corresponding end is above a second fluid pressure threshold.

19 Claims, 16 Drawing Sheets

(56) References Cited

U.S. PATENT DOCUMENTS

2012/0152629 A1 6/2012 Mather et al.

* cited by examiner

VOID PROTECTION SYSTEM

TECHNICAL FIELD

This disclosure relates to mining vehicles, such as mining shovels or excavators, and particularly to void protection systems for such mining vehicles.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Mining shovels are often powered by hydraulic pressure systems. In these systems, hydraulic fluid is transmitted throughout the machine to various actuators, or hydraulic cylinders, where the fluid is converted into energy for powering the machine's components as necessary. For instance, a dipper assembly of the shovel may be powered by an actuator. In this case, an operator may provide a command to the actuator powering the dipper via a control system, causing the actuator (e.g., a piston rod of the actuator) to retract or extend in order to move the dipper assembly. As an example, the actuator may be used to apply a crowding force into a bank of material in order to fill the dipper with mining material.

In some instances, such as when filled with material, the dipper assembly may move without an operator command due to its own weight, inadvertently extending or retracting the cylinder. When this occurs, a chamber of the cylinder may expand, creating a void in the cylinder. When the dipper assembly is moved by operator command, a source of fluid may be manually or automatically provided to fill the void and prevent cavitation. However, during a static condition (i.e. when the dipper assembly moves without an operator command), fluid is not typically provided without an operator command to fill the void, often leading to a cavitation within the cylinder. Cavitation within a hydraulic system can cause unwanted noise, damage to the hydraulic components, vibrations, a loss of efficiency, and can reduce the useful life of the system and its components.

Mining shovels may include a hydraulic system having a valve for controlling the flow of hydraulic fluid from a pump to a hydraulic cylinder. An example of such a hydraulic system can be found in U.S. Pat. No. 5,960,695 issued Oct. 5, 1999, for "System and Method for Controlling an Independent Metering Valve," which discloses an independent metering valve that includes four independently operable, electronically controlled metering valves to control fluid flow between a pump and hydraulic cylinder. The disclosed independent metering valve is not controlled to automatically respond to void conditions within the associated hydraulic cylinder, however, and the cylinder may be susceptible to voiding and/or cavitation when the cylinder is not being controlled via an operator command.

SUMMARY

An embodiment of the present disclosure relates to a mining shovel. The mining shovel includes a hydraulic cylinder having a rod end and a head end, a dipper coupled to the hydraulic cylinder such that movement of the hydraulic cylinder moves the dipper, a first fluid source configured to provide hydraulic fluid to the hydraulic cylinder, a second fluid source configured to provide hydraulic fluid to the hydraulic cylinder, a valve assembly coupled to the hydraulic cylinder and comprising one or more valves configured to fluidly connect the hydraulic cylinder to the first fluid source, an auxiliary valve configured to fluidly connect the hydraulic cylinder to the second fluid source, a sensor assembly configured to monitor the hydraulic cylinder, and a controller. The controller is configured to monitor fluid pressure within the hydraulic cylinder based on signals received from the sensor assembly, based on a determination that pressure in the rod end or the head end of the hydraulic cylinder is below a first fluid pressure threshold, configure the valve assembly to fluidly connect the corresponding end to the first fluid source, and if the first fluid source is unable to provide a sufficient amount of fluid to raise the pressure within the corresponding end above a second fluid pressure threshold, increase an opening of the auxiliary valve to fluidly connect the corresponding end to the second fluid source and cause the second fluid source to provide fluid to the corresponding end until fluid pressure in the corresponding end is above the second fluid pressure threshold.

Another embodiment of the present disclosure relates to a void protection system for a mining shovel. The system includes a valve assembly configured to couple to a hydraulic cylinder and comprising one or more valves configured to fluidly connect the hydraulic cylinder to a first fluid source, a second fluid source configured to provide hydraulic fluid to the hydraulic cylinder, an auxiliary valve configured to fluidly connect the hydraulic cylinder to the second fluid source, a sensor assembly configured to monitor the hydraulic cylinder, and a controller. The controller is configured to monitor fluid pressure within the hydraulic cylinder based on signals received from the sensor assembly, based on a determination that pressure in a rod end or a head end of the hydraulic cylinder is below a first fluid pressure threshold, configure the valve assembly to fluidly connect the corresponding end to the first fluid source, and if the first fluid source is not operational, increase an opening of the auxiliary valve to fluidly connect the corresponding end to the second fluid source and cause the second fluid source to provide fluid to the corresponding end until fluid pressure in the corresponding end is above a second fluid pressure threshold.

Another embodiment of the present disclosure relates to a mining shovel having a propel mode for moving the mining shovel across a surface. The mining shovel includes a hydraulic cylinder having a rod end and a head end, a dipper coupled to the hydraulic cylinder such that movement of the hydraulic cylinder moves the dipper, a first fluid source configured to provide hydraulic fluid to the hydraulic cylinder, wherein the first fluid source is not operational when the mining shovel is in the propel mode, a second fluid source configured to provide hydraulic fluid to the hydraulic cylinder, a valve assembly coupled to the hydraulic cylinder and comprising one or more valves configured to fluidly connect the hydraulic cylinder to the first fluid source, an auxiliary valve configured to fluidly connect the hydraulic cylinder to the second fluid source, a sensor assembly configured to monitor the hydraulic cylinder, and a controller configured to monitor fluid pressure within the hydraulic cylinder based on signals received from the sensor assembly. The controller is also configured to, based on a determination that pressure in the rod end or the head end of the hydraulic cylinder is below a first fluid pressure threshold, when the mining shovel is not in a propel mode, configure the valve assembly to fluidly connect the corresponding end to the first fluid source and cause the first fluid source to provide fluid to the corresponding end until the fluid pressure in the corresponding end is above a second fluid pressure threshold, when the mining shovel is in the propel mode, increase an opening of the auxiliary valve to fluidly connect the corresponding end to the second fluid source and cause the second fluid source to provide fluid to the corresponding end until the fluid pressure in the corresponding end is above the second fluid pressure threshold.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
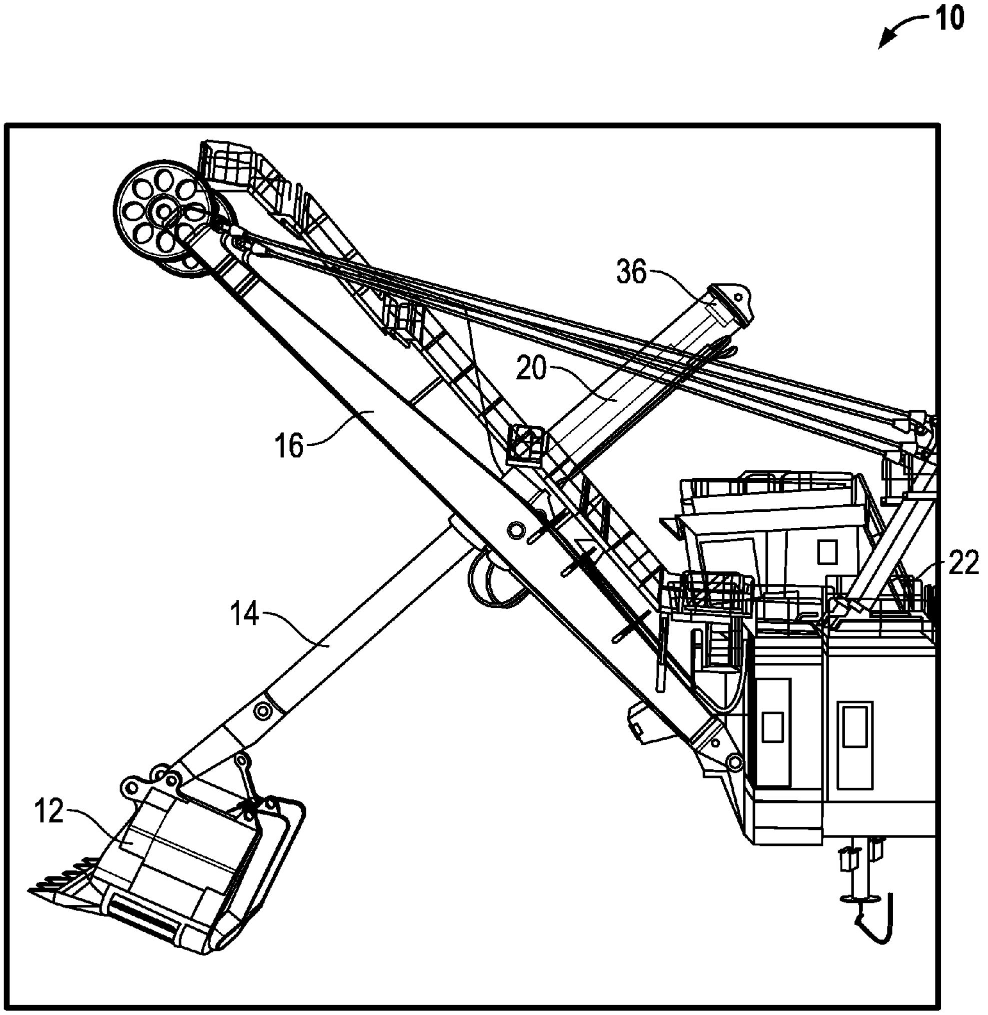
FIG. 1 is a side view of a mining shovel, according to an exemplary embodiment.

Referring now to FIG. 1, a mining shovel 10 is shown, according to an exemplary embodiment. The mining shovel 10 includes a dipper arm 14 and a dipper 12 supported by the boom assembly 16. Although the disclosure is shown and described by way of example with reference to a mining shovel 10, the disclosure is also applicable for use with any vehicle or device that uses a hydraulic cylinder (e.g. cylinder 20, etc.) to leverage a dipper or bucket, such as excavators, etc., all of which are intended to be within the scope of this disclosure.

The dipper arm 14 is pivotably coupled to the boom assembly 16, and configured to rotate relative to the boom assembly 16. The dipper 12 is coupled to the dipper arm 14, and operable to move in more than one direction along with the dipper arm 14. The dipper 12 is configured to hold earth and other materials that are loaded into the dipper 12 by the action of the dipper arm 14. The dipper arm 14 includes a hydraulic cylinder 20 used to apply a force to (i.e. move) the dipper 12, pushing the dipper 12 into a surface (i.e. a bank of material such as overburden, ore, or other material to be mined or moved and referred to collectively as "mining material") and filling the dipper 12 with mining material (e.g. earth, fragmented rock, etc.).

Typically, the dipper arm 14 and dipper 12 move in response to a signal received from an operator input device 22 located on the mining shovel 10. An operator may provide an input by pressing a button, moving a joystick, or otherwise interacting with the operator input device 22. In an exemplary embodiment, the operator input device 22 is coupled to a controller such as control module 32 (shown in FIG. 3), and the controller is coupled to one or more components within the mining shovel 10. The controller receives inputs from the operator input device 22 and the controller may provide a response. When the controller receives an input from the operator input device 22, the controller may cause a piston 24 within the hydraulic cylinder 20 to retract or extend, creating a void (i.e. a fluid pressure drop as a result of an expansion of volume) at a rod end 26 or head end 28 of the cylinder 20 (shown and described further with reference to FIGS. 3-9). In an exemplary embodiment, when the piston 24 is moved in response to an input from the operator input device 22, the controller causes a fluid source such as hydraulic pump 30 (shown in FIG. 3) to send pressurized fluid into the hydraulic cylinder 20, filling the void and preventing cavitation within the cylinder 20.

Referring briefly to FIGS. 3-9, the mining shovel 10 also includes a hydraulic control system shown as void protection system 40 that, among other control features, is intended to prevent voiding and/or cavitation within the hydraulic cylinder 20. In some instances, the piston 24 may extend or retract without input from the operator input device 22. For example, when the dipper 12 is filled with mining material, and the boom assembly 16 is above or below horizontal relative to the ground surface, the piston 24 may retract or extend inadvertently. When the piston 24 retracts or extends, a void may be created at the rod end 26 or the head end 28 of the cylinder 20. In these instances, the control module 32 does not receive an input from the operator input device 22 to fill the cylinder 20 with fluid, so the void protection system 40 monitors the cylinder 20 to provide hydraulic fluid as necessary.

The void protection system 40 includes a sensor assembly shown as sensors 34 for monitoring the fluid pressure within the rod end 26 and the head end 28 of the hydraulic cylinder 20. In an exemplary embodiment, the sensors 34 are located at or near the rod end 26 and the head end 28 of the hydraulic cylinder 20. The sensors 34 may also be mounted within work ports of one or more valves (e.g. valve 58, valve 60, etc.) within the system 40, within ports of the hydraulic cylinder 20, or at or near the hydraulic pump 30. In some embodiments, the void protection system 40 includes a single sensor 34 for monitoring the fluid pressure of the rod end 26 and the head end 28.

The sensors 34 of the void protection system 40 may include pressure sensors, displacement sensors, or another type of sensor configured to detect a void within the hydraulic cylinder 20. For instance, the sensors 34 may monitor a fluid pressure, displacement of the cylinder 20, the motion of the cylinder 20, and/or the velocity of the cylinder 20 in order to detect a void within the hydraulic cylinder 20. In an exemplary embodiment, the sensors 34 send signals to the control module 32 representing the fluid pressure within the hydraulic cylinder 20. When the mining shovel 10 is in the static load condition (i.e. no input is received from the operator input device 22), the control module 32 monitors the fluid pressure within the cylinder 20. When the fluid pressure within an end 28 or 26 decreases below a first fluid pressure threshold (i.e. a predetermined fluid pressure level associated with cavitation of the cylinder 20), the control module 32 increases the amount of pressurized fluid routed to the corresponding end 28 or 26. When the fluid pressure increases above a second fluid pressure threshold (e.g., a fluid pressure within a range of fluid pressures not associated with cavitation of the cylinder 20), the control module 32 decreases the amount of pressurized fluid routed to the corresponding end 28 or 26. In one embodiment, the second fluid pressure threshold is equal to the first fluid pressure threshold. In another embodiment, the second fluid pressure threshold is greater than the first fluid pressure threshold. For instance, the second fluid pressure threshold may be a predetermined amount greater than the first fluid pressure threshold in order to further reduce the likelihood of a void condition (e.g., cavitation) within the cylinder 20.

Figure 2:
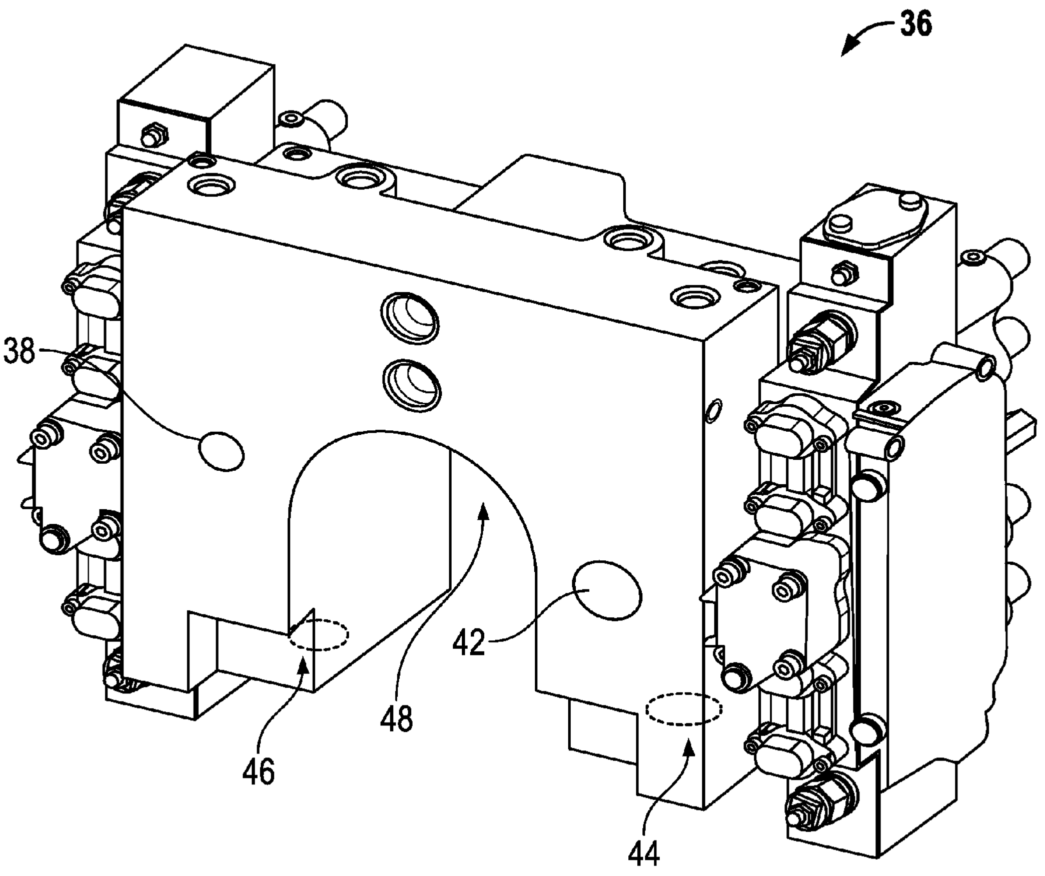
FIG. 2 is a perspective view of a control valve for a mining shovel, according to an exemplary embodiment.

Referring now to FIG. 2, a hydraulic valve system for the mining shovel 10 is shown as independent metering valve (IMV) assembly 36. The void protection system 40 may include a hydraulic valve system or assembly such as IMV assembly 36. In an exemplary embodiment, the IMV assembly 36 is located at or near the top end of the boom assembly 16 (shown in FIG. 1) and fluidly coupled to the hydraulic cylinder 20. The IMV assembly 36 includes a series of valves and fluid passageways (e.g. IMV arrangements) that may be used to route hydraulic fluid to and from hydraulic cylinders (e.g., cylinder 20) in order to control various components of the mining shovel 10 (or another hydraulically operated machine). The valves and passageways of the IMV assembly 36 are shown more particularly in the schematic representations of FIGS. 3-9. The IMV assembly 36 is shown to include two distinct IMV arrangements 116 and 118 in FIGS. 3-9, but may include any number of IMV arrangements as is suitable for the particular application in other embodiments.

As shown generally in FIGS. 3-9, the IMV assembly 36 is fluidly connected to the hydraulic cylinder 20 and to the hydraulic pump 30, and is configured to provide a fluid flow from the hydraulic pump 30 to the hydraulic cylinder 20. For instance, when the fluid pressure within the hydraulic cylinder 20 decreases below the first fluid pressure threshold, the control module 32 causes the IMV assembly 36 to increase the size of a fluid passageway (e.g. valve openings, etc.) from the hydraulic pump 30 to the corresponding end 26 or 28 of the hydraulic cylinder 20 (see FIG. 3). In this example, when the fluid pressure in the cylinder 20 increases above the second fluid pressure threshold, the control module 32 causes the IMV assembly 36 to decrease the size of the fluid passageways from the hydraulic pump 30 to the corresponding end 26 or 28 of the cylinder 20.

Referring further to FIG. 2, the IMV assembly 36 includes openings 38 and 42 for fluidly connecting the IMV assembly 36 to the rod end 26 and the head end 28 of the cylinder 20, respectively. The IMV assembly 36 also includes an opening 46 for fluidly connecting the IMV assembly 36 to the hydraulic pump 30, and an opening 44 for fluidly connecting the IMV assembly 36 to a hydraulic tank (not shown). In an exemplary embodiment, the IMV assembly 36 receives fluid from the hydraulic pump 30 through opening 46 and routes the fluid to the rod end 26 or the head end 28 of the cylinder 20 through one or more fluid paths, as necessary. The IMV assembly 36 may also receive return fluid from the hydraulic cylinder 20 and route the fluid back to the hydraulic tank for re-use. The IMV assembly 36 also includes one or more valves (shown schematically in further detail in FIGS. 3-9) for routing hydraulic fluid throughout the IMV assembly 36.

In the illustrated embodiment of FIG. 2, the IMV assembly 36 includes a curved recess 48 sized and shaped to couple the IMV assembly 36 to the hydraulic cylinder 20 (e.g. by fitting over a portion of the cylinder 20, etc.). As shown in FIG. 1, the IMV assembly 36 may be coupled to an end of the cylinder 20 and is configured to route fluid for powering the cylinder 20 in exemplary embodiments. However, it is not required that the IMV assembly 36 be mounted directly to the cylinder 20, and in other embodiments the IMV assembly 36 may be otherwise coupled to the mining shovel 10 such that the IMV assembly 36 is able to route fluid to the hydraulic cylinder 20.

In FIGS. 3-9, schematics are shown for more than one state of the void protection system 40, according to exemplary embodiments. According to the illustrated embodiment of FIG. 3, the piston 24 of the hydraulic cylinder 20 is shown extended by the weight of the dipper 12, rather than in response to an input from the operator input device 22. As the piston 24 is extended, the hydraulic fluid within the rod end 26 of the cylinder 20 is compressed and/or forced out of the cylinder 20 and back into the IMV assembly 36. The volume of the head end 28 of the cylinder 20 is increased, creating a void and decreasing the fluid pressure within the head end 28.

The IMV assembly 36 includes valves 50 and 52 fluidly connecting the hydraulic pump 30 to the head end 28 of the cylinder 20. When the fluid pressure in the head end 28 is below a first fluid pressure threshold, as measured by the sensors 34, the control module 32 may route pressurized hydraulic fluid from the pump 30 to the head end 28 by increasing the opening of the valves 50 and/or 52. In an exemplary embodiment, the control module 32 causes the valves 50 and 52 to open and close to varying degrees, allowing a larger or smaller amount of fluid to pass through the valves 50 and 52. In this embodiment, the valves 50 and 52 have an infinite number of open positions between the fully open (i.e. when the maximum amount of fluid passes through the valves 50 and 52) and fully closed (i.e. when no fluid or a minimal amount of fluid is allowed to pass through the valves 50 and 52) positions. The degree to which the valves 50 and 52 are opened or closed may vary depending on the measured fluid pressure within the cylinder 20. In some other embodiments, however, the valves 50 and 52 are configured to move discretely between the fully open and the fully closed positions.

Figure 3:
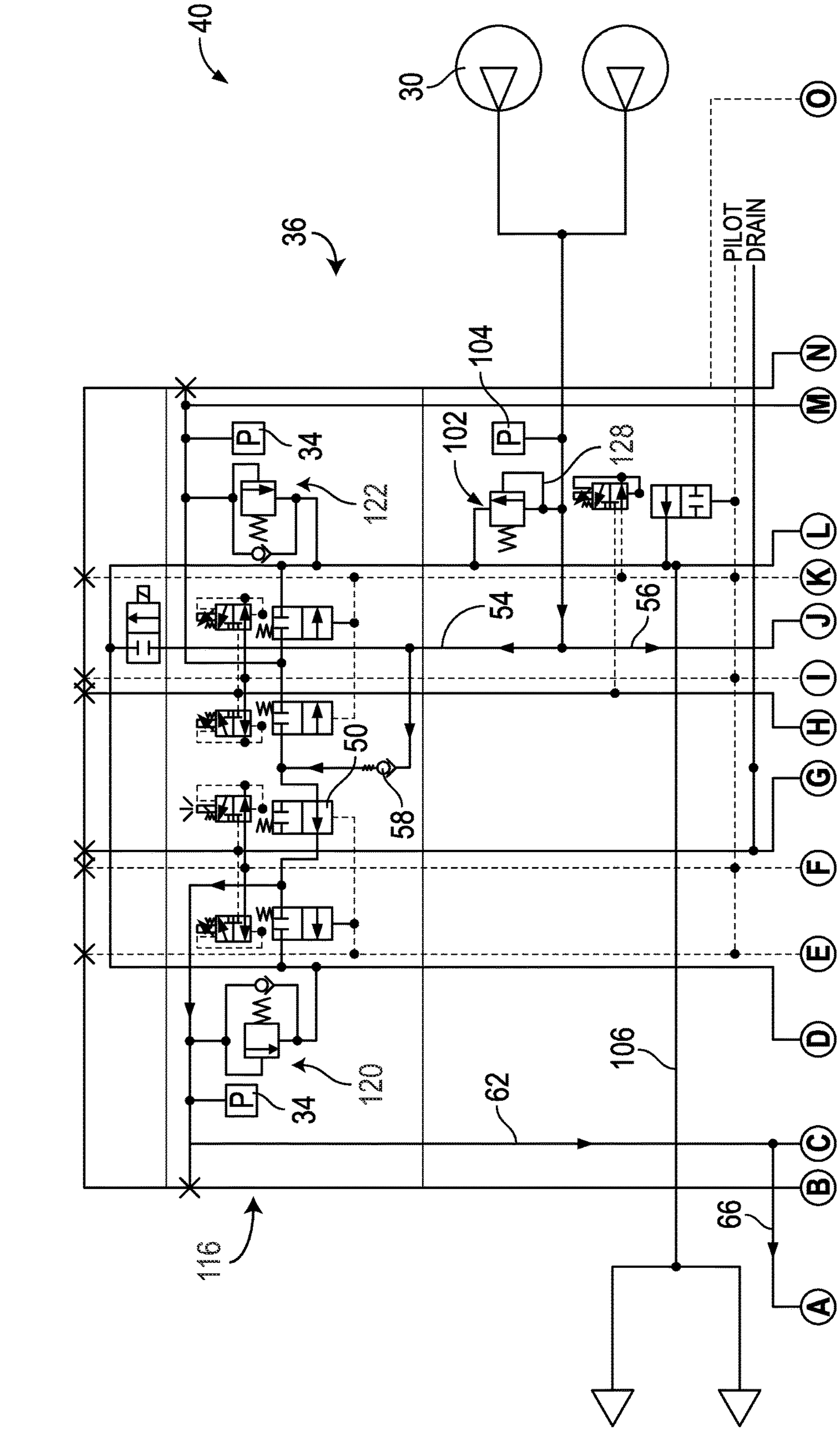
FIG. 3 is a schematic representation of a hydraulic system for a mining shovel, including a void protection system, according to an exemplary embodiment.
Figure 3:
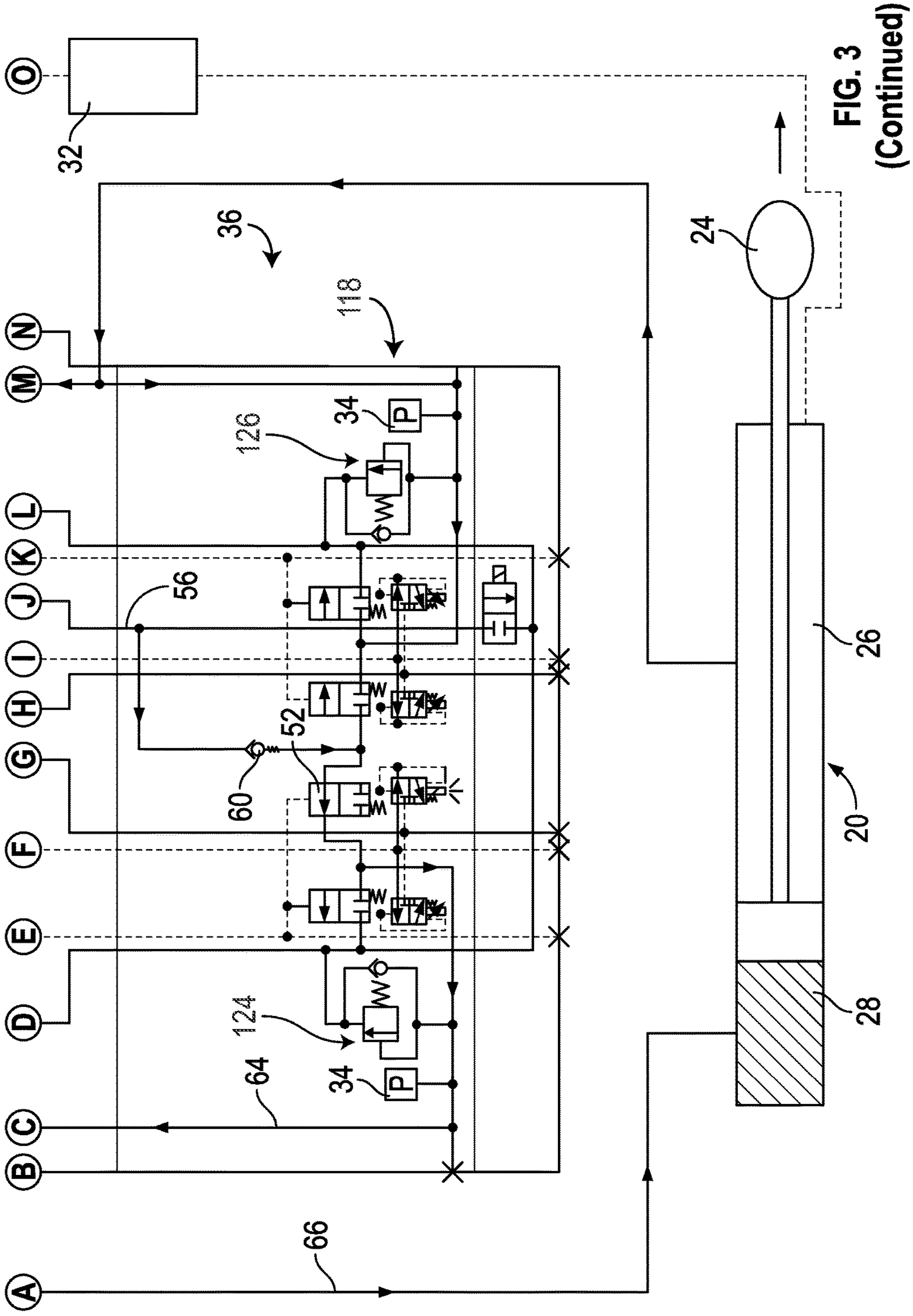

In the illustrated embodiment of FIG. 3, valves 50 and 52 are in an open position, allowing fluid from the hydraulic pump 30 to flow through the IMV assembly 36 to the head end 28 of the cylinder 20. The fluid flows from the pump 30 through fluid paths 54 and 56, and up to check valves 58 and 60, respectively. Once the fluid pressure builds to a predetermined level, the check valves 58 and 60 are pushed open and the fluid flows through the valves 50 and 52, through fluid paths 62 and 64, and meeting at fluid path 66 to fill the head end 28 with a sufficient amount of pressurized fluid to avoid cavitation. Once the fluid pressure within the head end 28 increases above a second fluid pressure threshold, indicating that a cavitation condition is no longer present, the control module 32 causes the opening of the valves 50 and 52 to be reduced, partially or fully blocking the fluid pathway from the pump 30 to the head end 28.

The IMV assembly 36 is also shown to include makeup valves 120 and 122 positioned within the IMV arrangement 116 and makeup valves 124 and 126 positioned within the IMV arrangement 118. In an exemplary embodiment, the makeup valves 120, 122, 124, and 126 may allow a relatively small amount of hydraulic fluid to flow through them and are intended to provide fluid to the head end 28 or rod end 26 when a void condition is present within the corresponding end 26 or 28. The fluid provided by the makeup valves 120, 122, 124, and 126 may prevent cavitation within the cylinder 20 until fluid from another source (e.g. the pump 30, accumulator 86, end 26 or 28, etc.) is routed to the cylinder 20. For instance, when a void condition is present within the head end 28 of the cylinder 20, the control module 32 may cause the makeup valve 120 to route fluid through fluid paths 62 and 66 to the head end 28 of the cylinder 20, preventing cavitation within the head end 28 of the cylinder 20. The makeup valves 120, 122, 124, and 126 are shown in the FIG. 3 according to an exemplary embodiment, but in other embodiments the void protection system 40 may include any number of makeup valves positioned within the IMV assembly 36 and/or the void protection system 40 to prevent a void condition within the cylinder 20.

Figure 4:
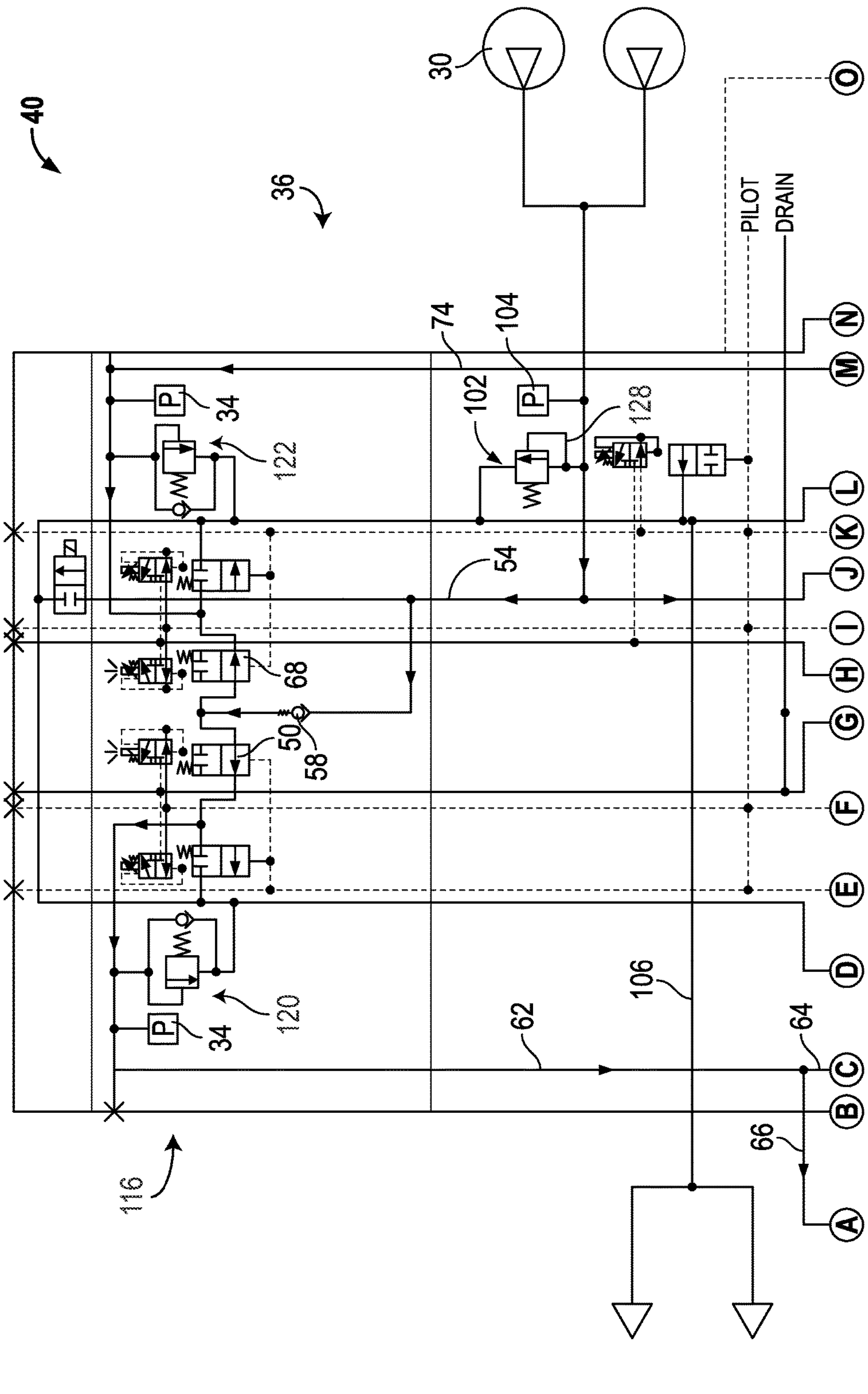
FIG. 4 is a schematic representation of another embodiment of the hydraulic system of FIG. 3, including a void protection system having a pump regeneration flow.
Figure 4:
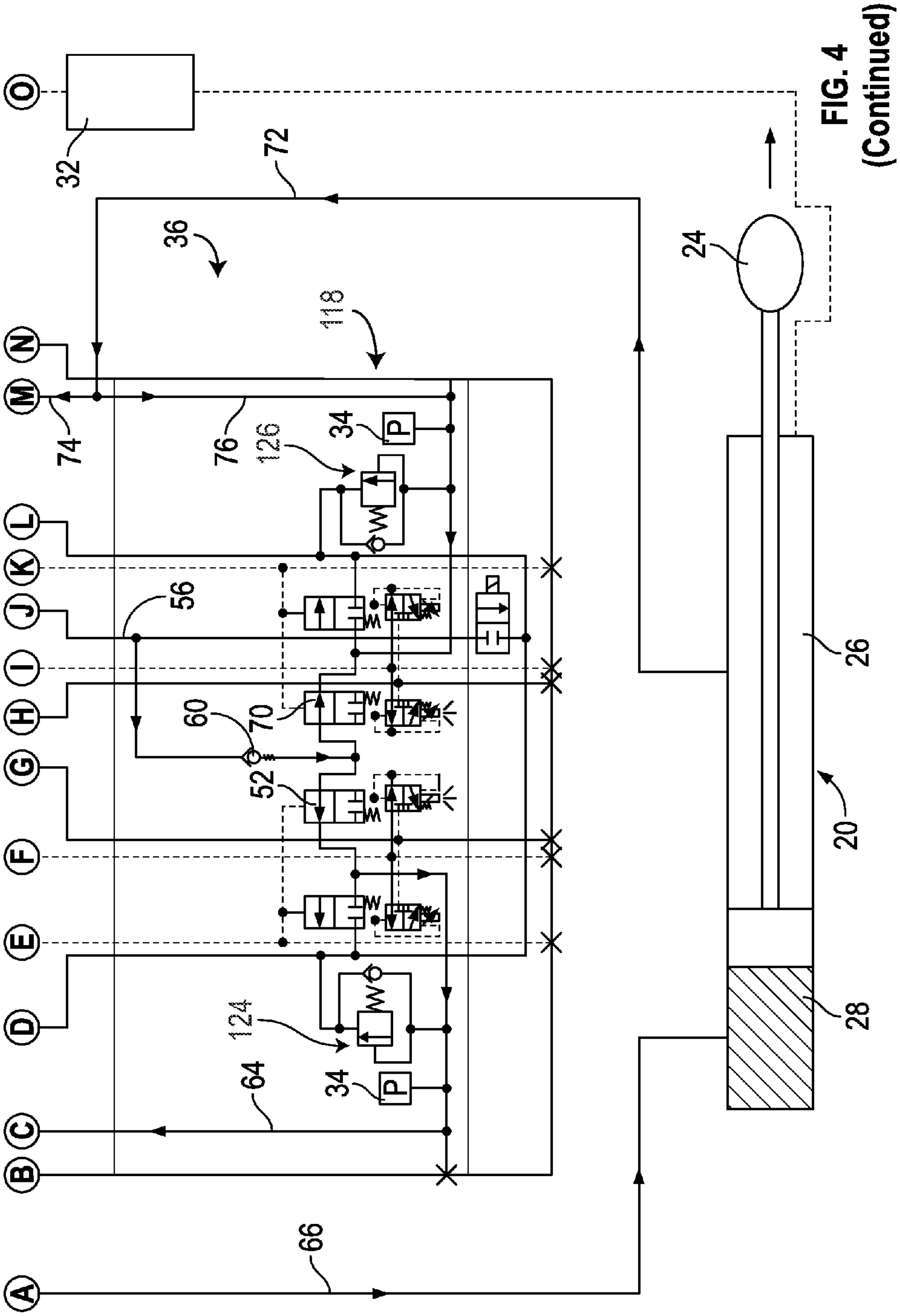

Referring now to FIG. 4, a schematic for the void protection system 40 is shown according to another embodiment of the system 40. In this embodiment, the piston 24 of the hydraulic cylinder 20 is shown extended by the weight of the dipper 12, rather than in response to an input from the operator input device 22. As the piston 24 is extended, the volume of the head end 28 of the cylinder 20 is increased, creating a void and decreasing the fluid pressure within the head end 28. As in the embodiment of FIG. 3, the control module 32 causes the valves 50 and 52 to open, routing hydraulic fluid from the pump 30 to the head end 28 of the cylinder 20 to fill the void within the head end 28.

In the illustrated embodiment of FIG. 4, the fluid provided by the pump 30 to the cylinder 20 may not be sufficient to prevent cavitation within the head end 28. Therefore, the control module 32 also causes valves 68 and 70 to open, metering the flow out of the rod end 26 of the cylinder 20. In an exemplary embodiment, the control module 32 causes the valves 68 and 70 to open and close to varying degrees, allowing a larger or smaller amount of fluid to pass through the valves 68 and 70. In this embodiment, the valves 68 and 70 have an infinite number of open positions between the fully open (i.e. when the maximum amount of fluid passes through the valves 68 and 70) and fully closed (i.e. when no fluid or a minimal amount of fluid is allowed to pass through the valves 68 and 70) positions. The degree to which the valves 68 and 70 are opened or closed may vary depending on the measured fluid pressure within the cylinder 20. In some other embodiments, however, the valves 68 and 70 are configured to move discretely between the fully open and the fully closed positions.

Referring again to FIG. 4, when the piston 24 is extended, the hydraulic fluid within the rod end 26 is compressed and forced out of the cylinder 20, back into the IMV assembly 36. The fluid is pushed from the rod end 26 of the cylinder 20 through fluid paths 72, 74, and 76, and through the open valves 68 and 70. The fluid is allowed to flow through open valves 50 and 52 and fluid paths 62, 64 and 66, then to the head end 28 of the cylinder 20, supplementing the fluid from the pump 30 in order to prevent cavitation within the head end 28 of the cylinder 20. The fluid routed from the rod end 26 may be intended to reduce the burden on the pump 30 until the pump 30 can respond to provide the required fluid flow. The control module 32 causes valves 68 and 70, as well as valves 52 and 50, to remain open until the fluid pressure within the head end 28 increases above the second fluid pressure threshold.

Figure 5:
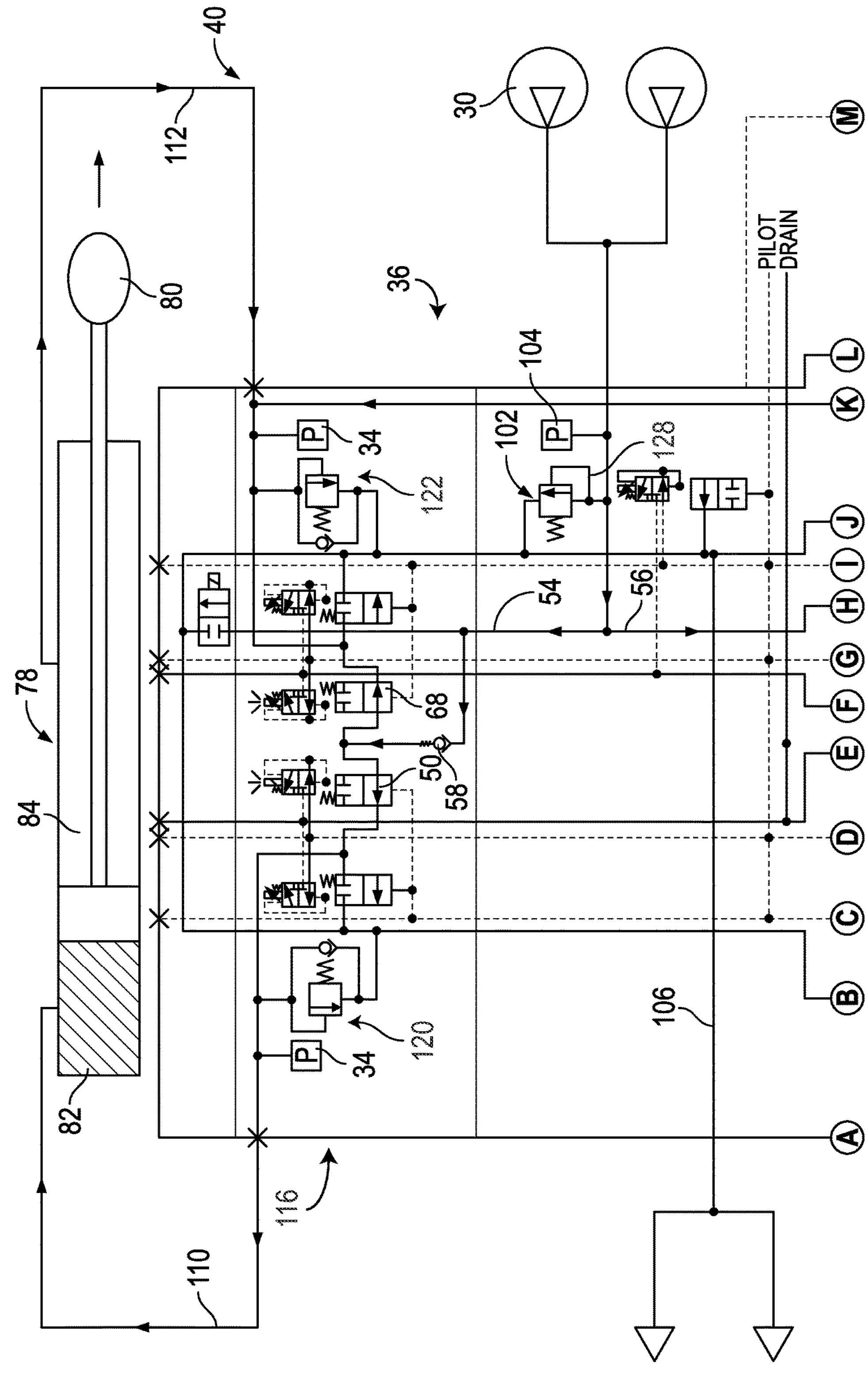
FIG. 5 is a schematic representation of another embodiment of the hydraulic system of FIG. 3, including a void protection system having a second hydraulic cylinder.
Figure 5:
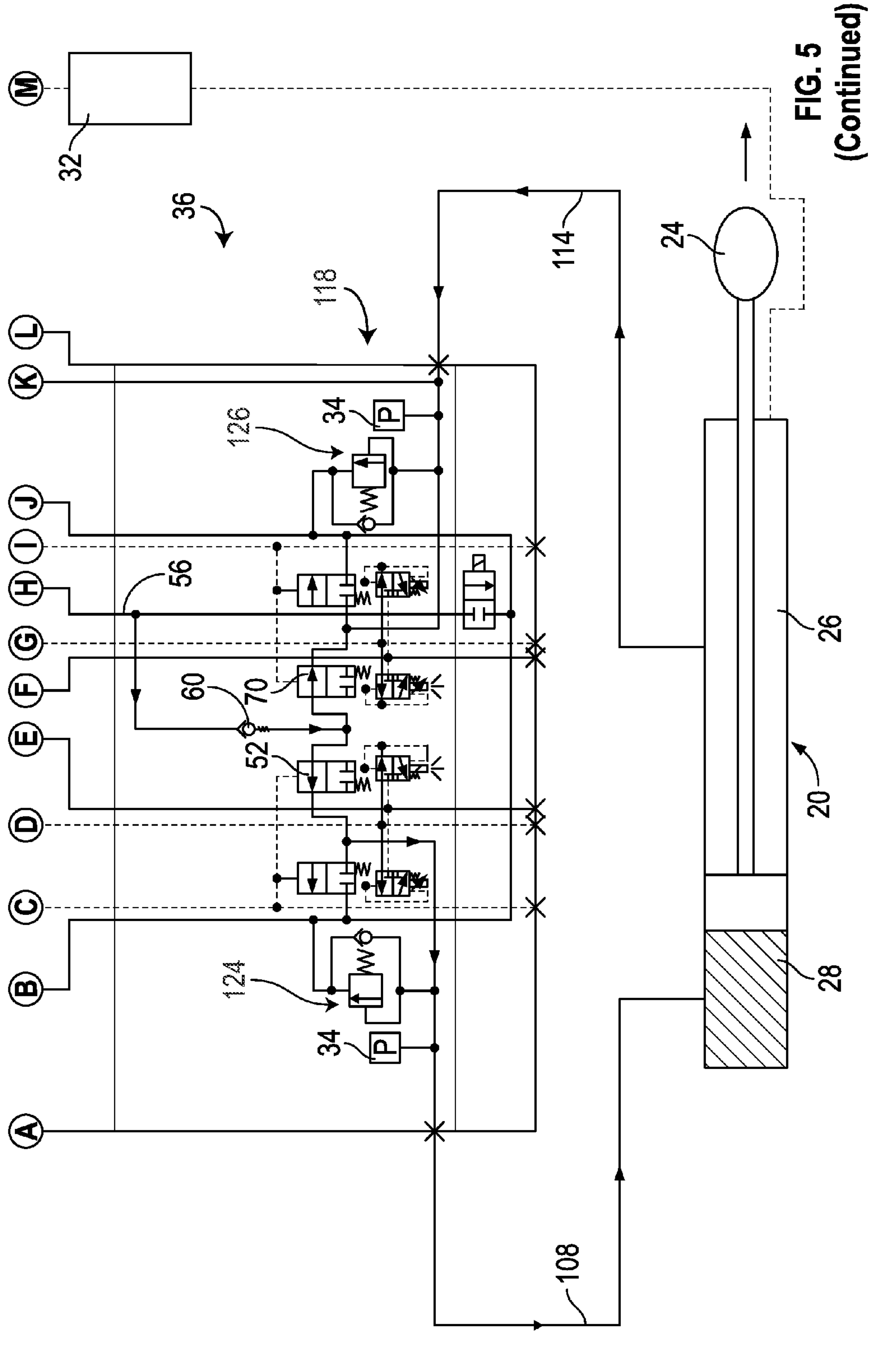

Referring now to FIG. 5, a schematic for the void protection system 40 is shown according to another embodiment of the system 40. In this embodiment, the mining shovel 10 includes two hydraulic cylinders 20 and 78. The hydraulic cylinders 20 and 78 are shown fluidly connected to the IMV assembly 36. However, in other embodiments having two hydraulic cylinders such as cylinders 20 and 78, the mining shovel 10 may include a second hydraulic valve system fluidly connected to the hydraulic cylinder 78, in addition to the IMV assembly 36 fluidly connected to the hydraulic cylinder 20. The hydraulic cylinder 78 includes a piston 80, a head end 82, and a rod end 84.

According to the illustrated embodiment of FIG. 5, the pistons 24 and 80 are shown extended by the weight of the dipper 12, rather than in response to an input from the operator input device 22. As the pistons 24 and 80 are extended, the volumes of the head ends 28 and 82 are increased, creating a void and decreasing the fluid pressure within the head ends 28 and 82. In this embodiment, the control module 32 causes the valves 50 and 52 to open, allowing pressurized fluid to flow from the pump 30 to the head ends 82 and 28, respectively, in order to prevent cavitation. However, in this embodiment the fluid provided by the pump 30 may not be sufficient to prevent cavitation within the head ends 28 and 82. Therefore, the control module 32 also causes valves 68 and 70 to open. When the pistons 24 and 80 are extended, the hydraulic fluid within the rod ends 26 and 84 is compressed and forced out of the hydraulic cylinders 20 and 78, respectively, and back into the IMV assembly 36. Fluid flows from the rod end 84 through fluid path 112, through open valves 68 and 50, and through fluid path 110 to the head end 82 to prevent cavitation. Fluid also flows from the rod end 26 through fluid path 114, through open valves 70 and 52, and through fluid path 108 to the head end 28 to prevent cavitation. The valves 68 and 70 are opened by the control module 32 in order to supplement the fluid from the pump 30 and reduce the burden on the pump 30 that results from the second cylinder 78. In some embodiments having multiple cylinders, all cylinders are fluidly connected to a single hydraulic valve system (e.g. IMV assembly 36, etc.), such as in the embodiment of FIG. 5. In other embodiments, the mining shovel 10 may include a single cylinder fluidly connected to more than one hydraulic valve system.

Figure 6:
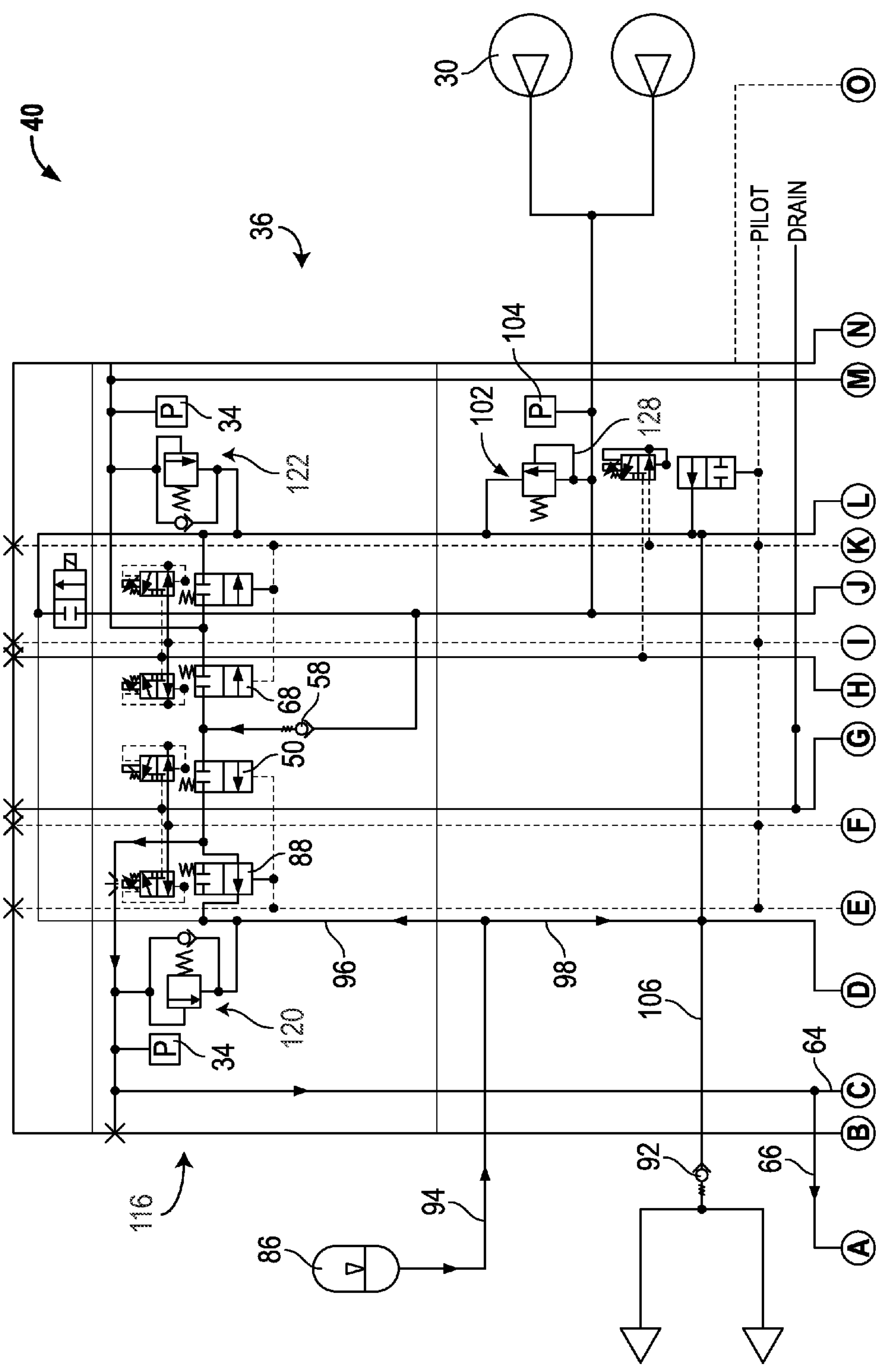
FIG. 6 is a schematic representation of another embodiment of the hydraulic system of FIG. 3, including a void protection system having a make-up accumulator.
Figure 6:
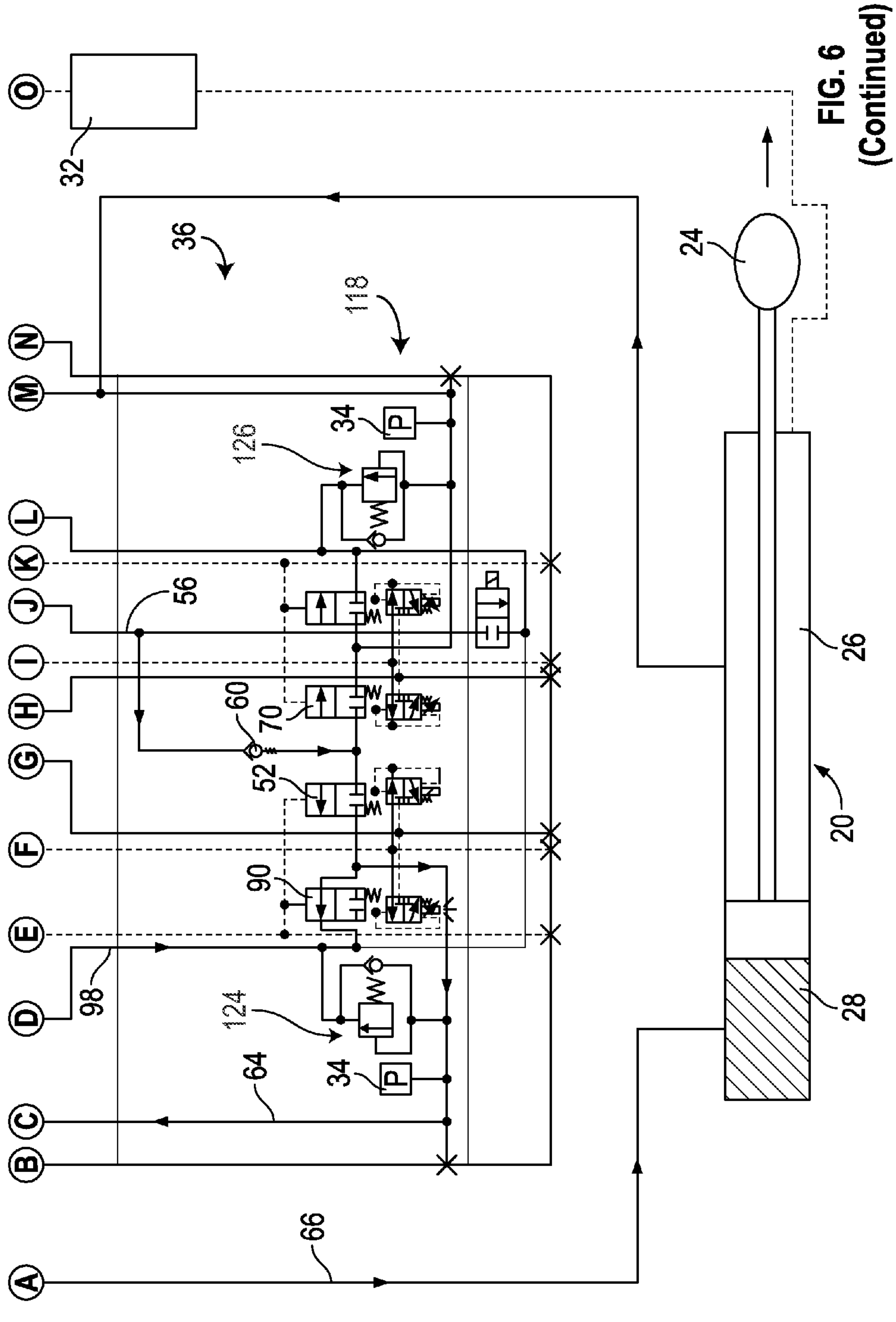

Referring now to FIG. 6, a schematic for the void protection system 40 is shown according to another embodiment of the system 40. In this embodiment, the void protection system 40 includes an accumulator 86 fluidly connected to the IMV assembly 36. The piston 24 of the hydraulic cylinder 20 is shown extended by the weight of the dipper 12, rather than in response to an input from the operator input device 22. As the piston 24 is extended, the volume of the head end 28 of the cylinder 20 is increased, creating a void and decreasing the fluid pressure within the head end 28. In this embodiment, the fluid provided by the pump 30 may not be sufficient to prevent cavitation within the head end 28 of the cylinder 20. The accumulator 86 therefore provides another source of fluid for filling the cylinder 20 (e.g., the head end 28) in order to prevent cavitation.

In the illustrated embodiment of FIG. 6, the control module 32 causes valves 88 and 90 to open when the fluid pressure within the head end 28 of the hydraulic cylinder 20 decreases below a first fluid pressure threshold, allowing fluid to flow through the valves 88 and 90. In an exemplary embodiment, the control module 32 causes the valves 88 and 90 to open and close to varying degrees, allowing a larger or smaller amount of fluid to pass through the valves 88 and 90. In this embodiment, the valves 88 and 90 have an infinite number of open positions between the fully open (i.e. when the maximum amount of fluid passes through the valves 88 and 90) and fully closed (i.e. when no fluid or a minimal amount of fluid is allowed to pass through the valves 88 and 90) positions. The degree to which the valves 88 and 90 are opened or closed may vary depending on the measured fluid pressure within the cylinder 20. In some other embodiments, however, the valves 88 and 90 are configured to move discretely between the fully open and the fully closed positions.

Referring again to FIG. 6, the control module 32 causes the accumulator 86 to send fluid into fluid path 94, through fluid paths 96 and/or 98, and through the valves 88 and/or 90. The fluid flows from open valves 88 and 90 through fluid paths 62 and 64, respectively, through fluid path 66, and into the head end 28 to prevent cavitation. In this embodiment, the void protection system 40 (e.g., the IMV assembly 36) may include a check valve 92 to prevent fluid from the accumulator 86 from returning to the hydraulic tank (not shown). Fluid from the accumulator 86 may be required build to a predetermined pressure in order to pass through the check valve 92 to the tank, maintaining a pressure within fluid paths 62 and 64 in order to fill a void in the head end 28 of the cylinder 20.

Figure 7:
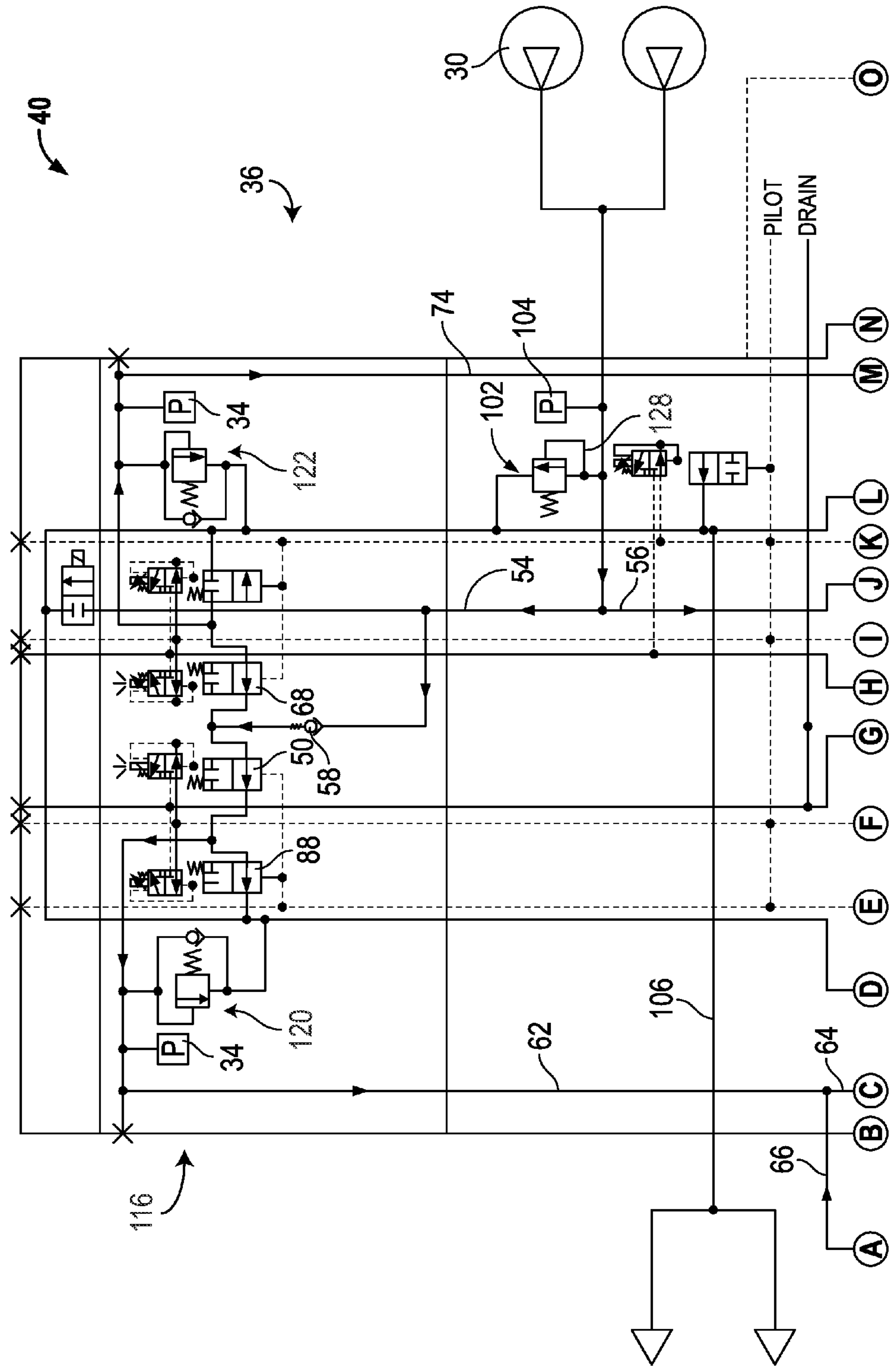
FIG. 7 is a schematic representation of another embodiment of the hydraulic system of FIG. 3, including a void protection system for filling the rod end of a cylinder.
Figure 7:
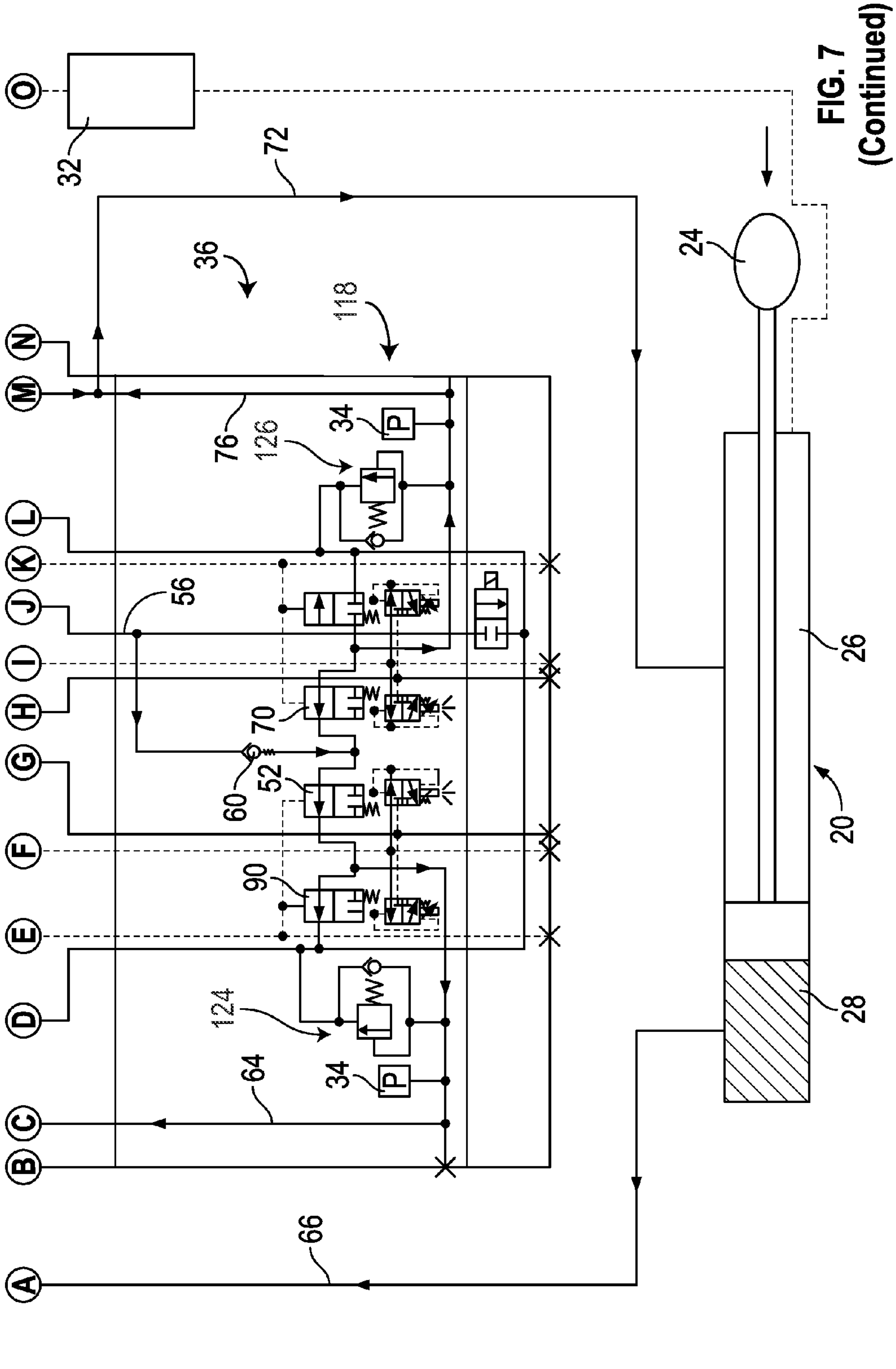

Referring now to FIG. 7, a schematic for the void protection system 40 is shown according to another embodiment of the system 40. In this embodiment, the piston 24 of the hydraulic cylinder 20 is shown retracted by the weight of the dipper 12. As the piston 24 is retracted, the hydraulic fluid within the head end 28 of the cylinder 20 is compressed and forced out of the cylinder 20, back into the IMV assembly 36. The volume of the rod end 26 of the cylinder 20 may be increased, creating a void and decreasing the fluid pressure within the rod end 26. When the fluid pressure in the rod end 26 is below the first fluid pressure threshold, as measured by the sensors 34, the control module 32 may cause the openings of the valves 50, 52, 68, and 70 to increase. When the piston 24 is retracted, fluid is pushed from the head end 28 of the cylinder 20 through fluid paths 66, 62, and 64, and through the open valves 50 and 52. The fluid is allowed to flow through open valves 68 and 70 and fluid paths 74, 76, and 72, then to the rod end 26 of the cylinder 20. The fluid from the head end 28 is used to prevent cavitation within the rod end 26 of the cylinder 20. The control module 32 may cause valves 50 and 52 to remain open until the fluid pressure within the rod end 26 increases above the second fluid pressure threshold.

Still referring to the illustrated embodiment of FIG. 7, the control module 32 may also route pressurized hydraulic fluid from the pump 30 to the rod end 26 by increasing the opening of the valves 68 and/or 70. In the illustrated embodiment of FIG. 7, valves 68 and 70 are open, allowing fluid from the hydraulic pump 30 to flow through the IMV assembly 36 to the rod end 26 of the cylinder 20. The fluid flows from the pump 30 through fluid paths 54 and 56, and up to check valves 58 and 60, respectively. Once the fluid pressure builds to a predetermined level, the check valves 58 and 60 are pushed open and the fluid flows through the valves 68 and 70, through fluid paths 74 and 76, and meeting at fluid path 72 to fill the rod end 26 with a sufficient amount of pressurized fluid to avoid cavitation. Once the fluid pressure within the rod end 26 increases above a second fluid pressure threshold, indicating that a cavitation condition is no longer present, the control module 32 causes the valves 68 and 70 to close, blocking the fluid pathway from the pump 30 to the rod end 26. The fluid from the pump 30 is intended to supplement the fluid from the head end 28 of the cylinder 20. In some embodiments, the fluid routed from the head end 28 may be intended to prevent cavitation within the rod end 26 until fluid from the pump 30 reaches the rod end 26.

According to the illustrated embodiment of FIG. 7, the control module 32 may also cause valves 88 and 90 to open. In this embodiment, fluid in excess of the amount necessary to prevent cavitation within the rod end 26 may be routed from the head end 28 into the IMV assembly 36. This excess fluid may be routed from the head end 28 through open valves 88 and/or 90. The fluid is then routed through fluid paths 62 and/or 64, through fluid path 106, and outside of the IMV assembly 36 to a hydraulic tank (not shown) for re-use.

Figure 8:
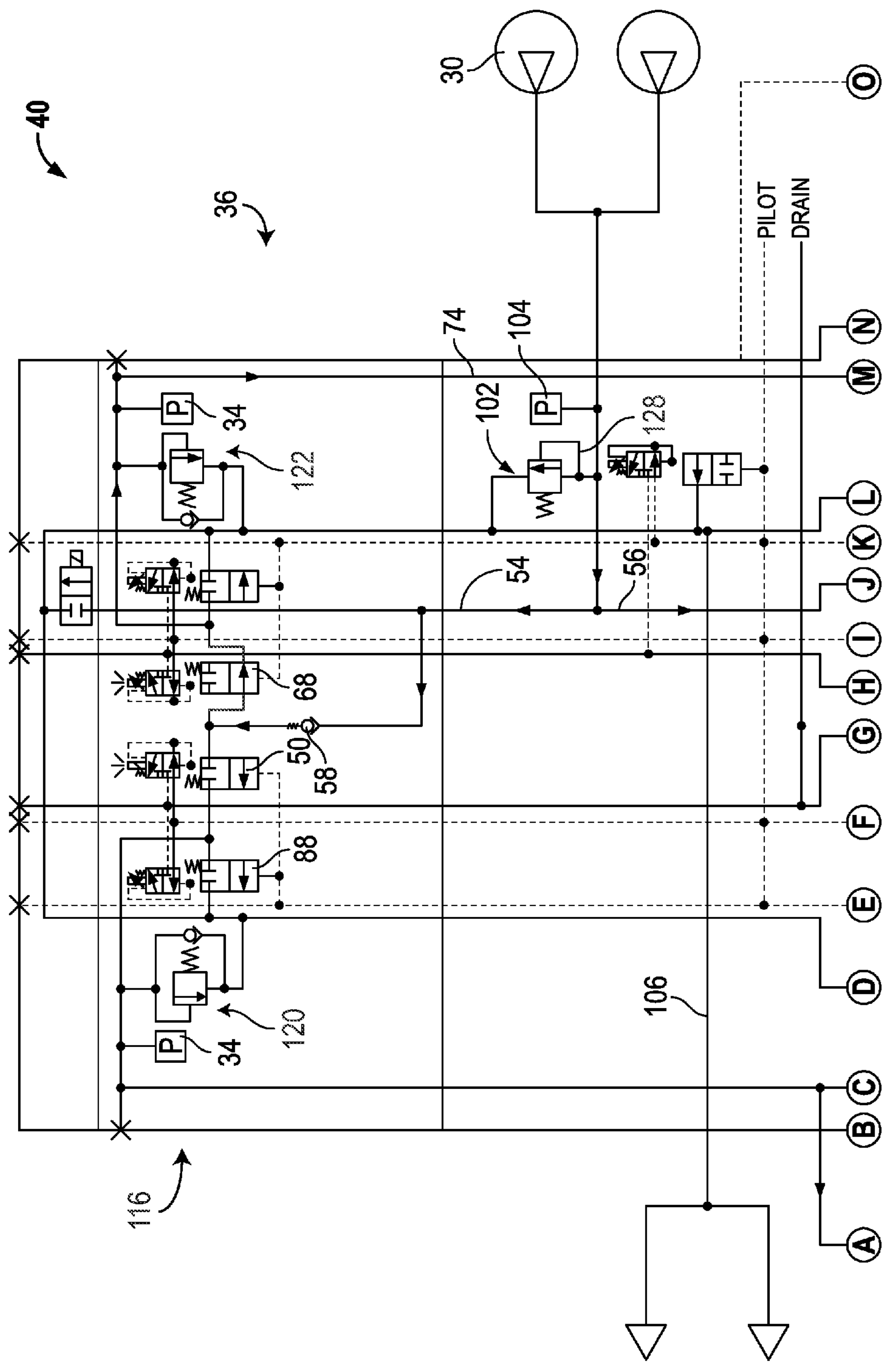
FIG. 8 is a schematic representation of another embodiment of the hydraulic system of FIG. 3, including a void protection system for compressing fluid at the rod end of a cylinder.
Figure 8:
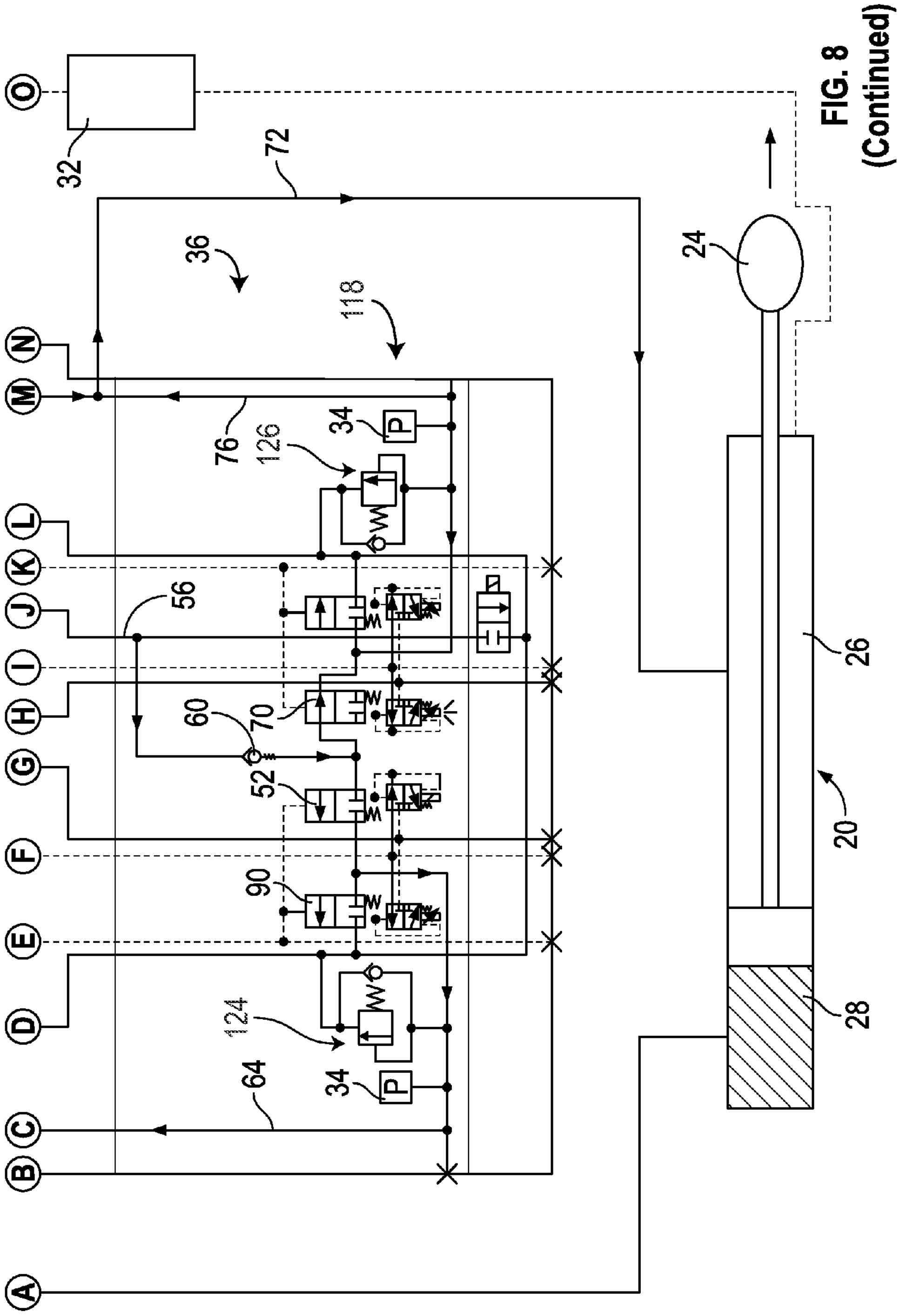

Referring now to FIG. 8, a schematic for the void protection system 40 is shown according to another embodiment of the system 40. In this embodiment, the piston 24 of the hydraulic cylinder 20 is shown extended by the weight of the dipper 12, creating a void at the head end 28 of the cylinder 20. In response to the void condition (i.e. the fluid pressure is below the first fluid pressure threshold), the control module 32 may cause valves 68 and 70 to open, and valves 50 and 52 to remain closed. When valves 68 and 70 are opened, fluid from the pump 30 may flow through fluid paths 54 and 56, through check valves 58 and 60, and through the open valves 68 and 70. The fluid is routed by the IMV assembly 36 through fluid paths 74 and 76, into fluid path 72, and to the rod end 26 of the cylinder 20. The fluid from the pump 30 may compress the fluid in the rod end 26 of the cylinder 20, raising the fluid pressure within the rod end 26. As the fluid pressure in the rod end 26 is raised, the retraction of the piston 24 is reduced, preventing cavitation within the head end 28.

Figure 9:
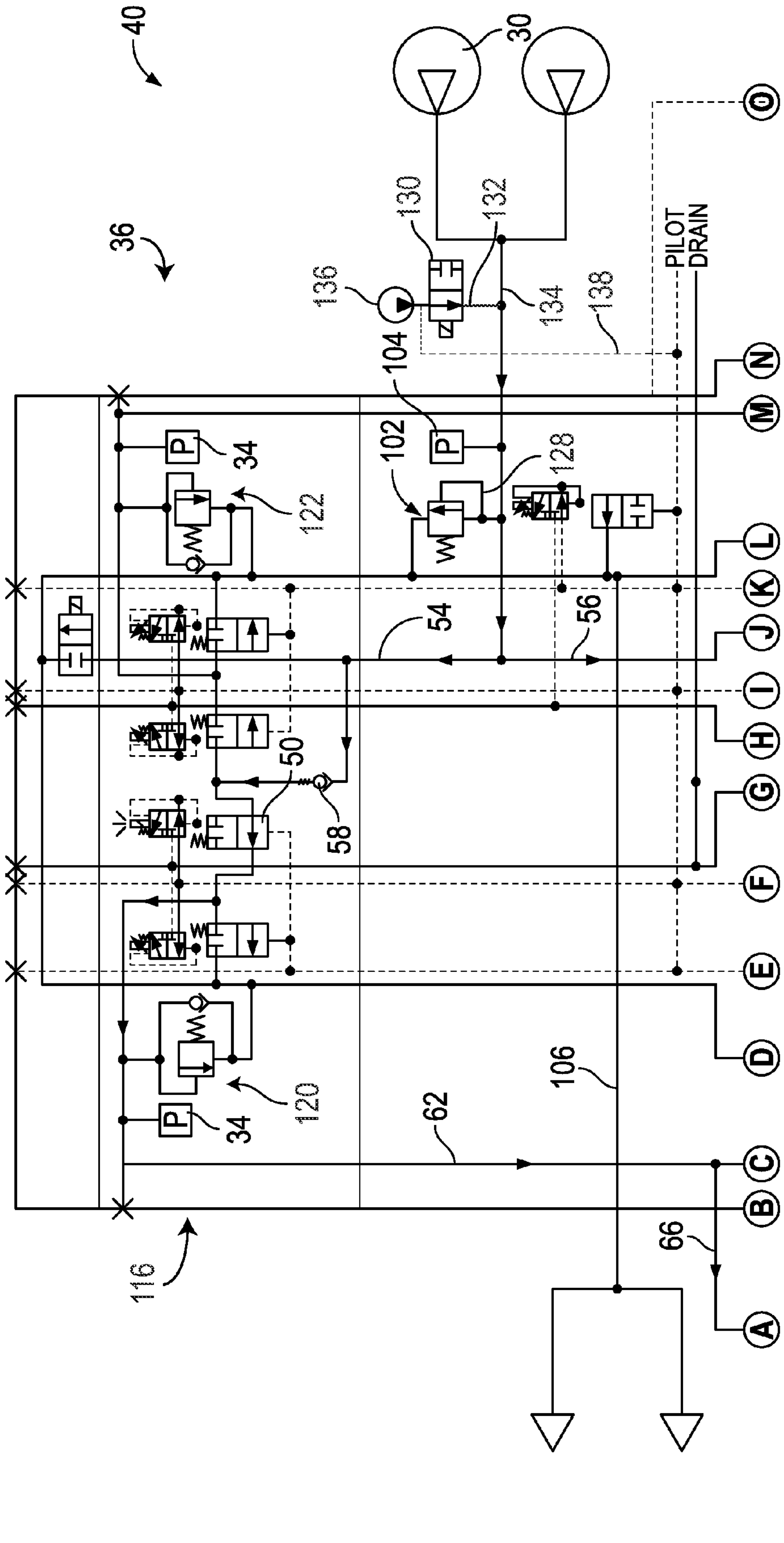
FIG. 9 is a schematic representation of another embodiment of the hydraulic system of FIG. 3, including a void protection system having an auxiliary pump.
Figure 9:
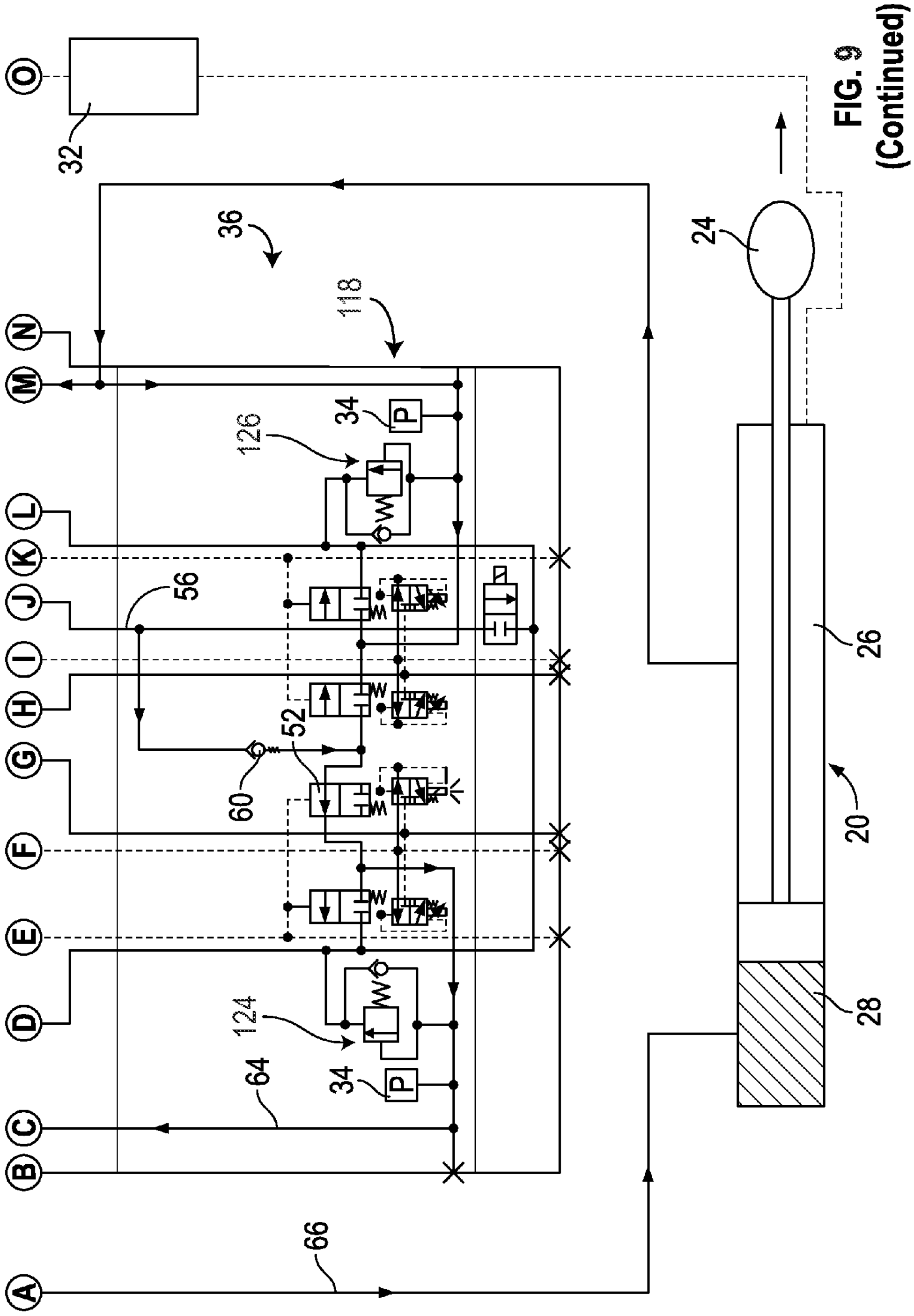

Referring now to FIG. 9, a schematic for the void protection system 40 is shown according to another embodiment of the system 40. In this embodiment, the piston 24 of the hydraulic cylinder 20 is again shown extended by the weight of the dipper 12, which may create a void and decrease the fluid pressure within the head end 28. However, in this embodiment the pump 30 is unable to provide hydraulic fluid to the IMV assembly 36 and/or the cylinder 20 in order to prevent cavitation at the head end 28 of the cylinder 20. For instance, the mining shovel 10 may include some operating modes in which electric power is diverted away from the pump 30 or a hydraulic system of the shovel 10 (e.g., the void protection system 40) in order to provide power to other components of the shovel 10. In these operating modes, the pump 30 may not receive a sufficient amount of electric power to operate the pump 30 and provide a flow of hydraulic fluid to the cylinder 20. The allocation of electric power to the components of the shovel 10 may be controlled by the control module 32 and/or according to a selected mode of the shovel 10. The control module 32 may cause electric power to be provided to various components of the shovel 10 in response to commands from the operator input device 22, such as to utilize a different mode of the shovel 10.

In an exemplary embodiment, the mining shovel 10 may include a first operating mode, such as a "crowd" mode for operating the dipper 12 of the shovel 10. In the crowd mode, electric power may be provided to the pump 30 and/or other components associated with movement of the hydraulic cylinder 20 (e.g., components of the void protection system

40). When powered, the pump 30 may send hydraulic fluid through the IMV assembly 36 and to the hydraulic cylinder 20. For instance, the void protection system 40 may route hydraulic fluid from the pump 30 to the cylinder 20 in order to move the dipper 12 (e.g., generate a "crowding" force) or to prevent a void condition at the cylinder 20.

The mining shovel 10 may also include a second operating mode, such as a "propel mode." In the propel mode, available electric power may be diverted away from the pump 30 to components of the shovel 10 that are used to propel, or move, the shovel 10. For instance, available electric power may be substantially utilized to drive the tracks or wheels of the shovel 10 in order to move the shovel 10 to another location. Thus, in the propel mode, the pump 30 may not receive the power necessary to supply hydraulic fluid to the assembly 36 and prevent cavitation within the cylinder 20. FIG. 9 shows an example schematic of the void protection system 40 when the mining shovel 10 is in the propel mode (or another mode in which power is diverted away from the hydraulic pump 30).

In order to prevent or eliminate a void condition at the cylinder 20 when the pump 30 is unable to provide hydraulic fluid, the void protection system 40 may include a fluid source such as auxiliary pump 136. The pump 136 is coupled to the IMV assembly 36 such that the IMV assembly 36 is configured to fluidly connect the pump 136 to cylinder 20. The auxiliary pump 136 is configured to remain operational (e.g., to provide hydraulic fluid) even when the mining shovel 10 is in propel mode or in another operating mode in which the pump 30 does not receive sufficient electric power to provide hydraulic fluid to the system 40. In some embodiments, the pump 136 may be a pilot pump for the system 40 and configured to transmit fluid pressure via pilot line 138 to control various valves of the void protection system 40. In other embodiments, the pump 136 may be another hydraulic pump powered separately from the pump 30 and configured to provide hydraulic fluid in response to a void condition at the cylinder 20. The pump 136 may be controlled by the control module 32. For instance, the control module 32 may be configured to send a signal to the pump 136 to cause the pump 136 to pump hydraulic fluid.

The void protection system 40 may also include a valve 130 (e.g., a pilot diverter valve) configured to control the flow of hydraulic fluid from the alternative fluid source (e.g., the pump 136) to the cylinder 20 (e.g., to the IMV assembly 36). The valve 130 may be coupled to the pump 136 and configured to fluidly connect the pump 136 to the IMV assembly 36. The valve 130 may be a solenoid valve or another type of valve configured to open and close to control the flow of hydraulic fluid. The valve 130 may be controlled by the control module 32. For instance, the control module 32 may determine that a void condition is present at the head end 28 of the cylinder 20 based on signals received from the sensor assembly 34. When a void condition is detected (e.g., when the fluid pressure in the head end 28 is below a first fluid pressure threshold) and the pump 30 is unable to provide a sufficient amount of hydraulic fluid to alleviate the void condition, the control module 32 may route pressurized hydraulic fluid from the pump 136 to the head end 28 by increasing an opening of the valve 130 (e.g., moving the valve 130 to an open position, as shown in FIG. 9). In an exemplary embodiment, the control module 32 causes the valve 130 to open and close to varying degrees, allowing a larger or smaller amount of fluid to pass through the valve 130. In this embodiment, the valve 130 includes an infinite number of open positions between the fully open position (i.e. when the maximum amount of fluid passes through the valve 130) and fully closed position (i.e. when no fluid or a minimal amount of fluid is allowed to pass through the valve 130). The degree to which the valve 130 is opened or closed may vary depending on the measured fluid pressure within the cylinder 20. In some other embodiments, however, the valve 130 is configured to move discretely between the fully open and the fully closed positions.

Once the valve is in an open position, as shown in the illustrated embodiment of FIG. 9, hydraulic fluid is routed from the pump 136 through the open valve 130, through fluid lines 132 and 134, and into the IMV assembly 36. The fluid flows from the fluid line 134 through fluid paths 54 and 56, and up to check valves 58 and 60, respectively. Once the fluid pressure builds to a predetermined level, the check valves 58 and 60 are pushed open and the fluid flows through the open valves 50 and 52, through fluid paths 62 and 64, and meeting at fluid path 66 to fill the head end 28 with a sufficient amount of pressurized fluid to avoid cavitation. Once the fluid pressure within the head end 28 increases above a second fluid pressure threshold, indicating that a cavitation condition is no longer present, the control module 32 may cause the openings of one or more valves (e.g., valve 130, valves 50 and 52, etc.) to be reduced or closed, partially or fully blocking the fluid pathway from the pump 136 to the head end 28.

Referring again to FIGS. 3-9, the IMV assembly 36 may include a relief valve 102. The control module 32 may cause the relief valve 102 to open when pressure within the IMV assembly 36 reaches a third fluid pressure threshold (i.e. fluid pressure at which the IMV assembly 36 or its components are at risk for damage). When the relief valve 102 opens, fluid passes through the valve 102, through pump bypass line 128, and through fluid path 106 to the hydraulic tank for re-use. The pump bypass line 128 diverts fluid to the tank to circulate oil and prevent a high standby pressure within the system 40. The fluid pressure within the system 40 is measured by a pressure sensor 104 located near the hydraulic pump 30.

It should be noted that the valves (e.g. valves 50, 52, 68, 70, 88, 90, etc.) that are shown in the FIGURES and described above may be any types of valves configured to route fluid throughout the void protection system 40. For instance, the valves may be spool valves, poppet valves, servo valves, or the like.

The construction and arrangements of the void protection system, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

INDUSTRIAL APPLICABILITY

The disclosed void protection system may be implemented into any hydraulic vehicle or device having a hydraulic cylinder forced to extend or retract due to gravity. The disclosed void protection system may reduce damage to the hydraulic system and the vehicle components by reducing cavitation within the hydraulic system, particularly when the main hydraulic pump is not operational. The void protection system may increase the life of the hydraulic components by preventing damage to the components due to cavitation, and may decrease the response time to a cavitation condition by automatically creating a response when a void condition occurs within the system. The disclosed void protection system may also reduce unwanted noise and vibrations within the vehicle and increase the vehicle's efficiency.

It will be apparent to those skilled in the art that various modifications and variations can be made to the disclosed void protection system. Other embodiments will be apparent to those skilled in the art from consideration of the specification and practice of the disclosed void protection system. It is intended that the specification and examples be considered as exemplary only, with a true scope being indicated by the following claims and their equivalents.

What is claimed is:

1. A mining shovel, comprising:
- a hydraulic cylinder having a rod end and a head end;
- a dipper coupled to the hydraulic cylinder such that movement of the hydraulic cylinder moves the dipper;
- a first fluid source configured to provide hydraulic fluid to the hydraulic cylinder;
- a second fluid source configured to provide hydraulic fluid to the hydraulic cylinder;
- a valve assembly coupled to the hydraulic cylinder and comprising one or more valves configured to fluidly connect the hydraulic cylinder to the first fluid source;
- an auxiliary valve configured to fluidly connect the hydraulic cylinder to the second fluid source;
- a sensor assembly configured to monitor the hydraulic cylinder; and
- a controller configured to:
  - monitor fluid pressure within the hydraulic cylinder based on signals received from the sensor assembly;
  - configure the valve assembly to fluidly connect the corresponding end to the first fluid source based on a determination that pressure in the rod end or the head end of the hydraulic cylinder is below a first fluid pressure threshold; and
  - increase an opening of the auxiliary valve to fluidly connect the corresponding end to the second fluid source and cause the second fluid source to provide fluid to the corresponding end until fluid pressure in the corresponding end is above the second fluid pressure threshold if the first fluid source is unable to provide a sufficient amount of fluid to raise the pressure within the corresponding end above a second fluid pressure threshold; and
- wherein the mining shovel includes a first operating mode in which power is provided to the first fluid source to enable the first fluid source to generate hydraulic fluid, and a second operating mode in which power is not provided to the first fluid source such that the first fluid source is not operational.

2. The mining shovel of claim 1, wherein the controller is further configured to fluidly disconnect the corresponding end from the second fluid source when the fluid pressure in the corresponding end of the hydraulic cylinder increases beyond the second fluid pressure threshold.

3. The mining shovel of claim 1, wherein the valve assembly is coupled to the auxiliary valve and is configured to fluidly connect the hydraulic cylinder to the second fluid source via the auxiliary valve.

4. The mining shovel of claim 1, wherein the second fluid source remains operational when the mining shovel is in the second operating mode.

5. The mining shovel of claim 1, wherein the second fluid source is a pilot pump configured to provide fluid to operate the one or more valves of the valve assembly.

6. The mining shovel of claim 5, wherein the auxiliary valve is a pilot diverter valve configured to divert fluid from the pilot pump to the hydraulic cylinder to raise the fluid pressure at the hydraulic cylinder above the second fluid pressure threshold.

7. The mining shovel of claim 5, wherein the second fluid source is configured to provide a sufficient amount of fluid to simultaneously operate the one or more valves of the valve assembly and raise the fluid pressure at the hydraulic cylinder above the second fluid pressure threshold when the first fluid source is not operational.

8. A void protection system for a mining shovel, the system comprising:
- a valve assembly configured to couple to a hydraulic cylinder and comprising one or more valves configured to fluidly connect the hydraulic cylinder to a first fluid source;
- a second fluid source configured to provide hydraulic fluid to the hydraulic cylinder;
- an auxiliary valve configured to fluidly connect the hydraulic cylinder to the second fluid source;
- a sensor assembly configured to monitor the hydraulic cylinder; and
- a controller configured to:
  - monitor fluid pressure within the hydraulic cylinder based on signals received from the sensor assembly;
  - configure the valve assembly to fluidly connect the corresponding end to the first fluid source based on a determination that pressure in a rod end or a head end of the hydraulic cylinder is below a first fluid pressure threshold; and
  - increase an opening of the auxiliary valve to fluidly connect the corresponding end to the second fluid source and cause the second fluid source to provide fluid to the corresponding end until fluid pressure in the corresponding end is above a second fluid pressure threshold if the first fluid source is not operational.

9. The system of claim 8, wherein the controller is further configured to fluidly disconnect the corresponding end from the second fluid source when the fluid pressure in the corresponding end of the hydraulic cylinder increases beyond the second fluid pressure threshold.

10. The system of claim 8, wherein the valve assembly is coupled to the auxiliary valve and is configured to fluidly connect the hydraulic cylinder to the second fluid source via the auxiliary valve.

11. The system of claim 8, wherein the second fluid source is a pilot pump configured to provide fluid to operate the one or more valves of the valve assembly.

12. The system of claim 11, wherein the auxiliary valve is a pilot diverter valve configured to divert fluid from the pilot pump to the hydraulic cylinder to raise the fluid pressure at the hydraulic cylinder above the second fluid pressure threshold.

13. The system of claim 11, wherein the second fluid source is configured to provide a sufficient amount of fluid to simultaneously operate the one or more valves of the valve assembly and raise the fluid pressure at the hydraulic cylinder above the second fluid pressure threshold when the first fluid source is not operational.

14. A mining shovel having a propel mode for moving the mining shovel across a surface, the mining shovel comprising:

a hydraulic cylinder having a rod end and a head end;

a dipper coupled to the hydraulic cylinder such that movement of the hydraulic cylinder moves the dipper;

a first fluid source configured to provide hydraulic fluid to the hydraulic cylinder, wherein the first fluid source is not operational when the mining shovel is in the propel mode;

a second fluid source configured to provide hydraulic fluid to the hydraulic cylinder;

a valve assembly coupled to the hydraulic cylinder and comprising one or more valves configured to fluidly connect the hydraulic cylinder to the first fluid source;

an auxiliary valve configured to fluidly connect the hydraulic cylinder to the second fluid source;

a sensor assembly configured to monitor the hydraulic cylinder; and a controller configured to monitor fluid pressure within the hydraulic cylinder based on signals received from the sensor assembly, and based on a determination that pressure in the rod end or the head end of the hydraulic cylinder is below a first fluid pressure threshold, to:

when the mining shovel is not in a propel mode, configure the valve assembly to fluidly connect the corresponding end to the first fluid source and cause the first fluid source to provide fluid to the corresponding end until the fluid pressure in the corresponding end is above a second fluid pressure threshold; and when the mining shovel is in the propel mode, increase an opening of the auxiliary valve to fluidly connect the corresponding end to the second fluid source and cause the second fluid source to provide fluid to the corresponding end until the fluid pressure in the corresponding end is above the second fluid pressure threshold.

15. The mining shovel of claim 14, wherein the valve assembly is coupled to the auxiliary valve and is configured to fluidly connect the hydraulic cylinder to the second fluid source via the auxiliary valve.

16. The mining shovel of claim 14, wherein the second fluid source remains operational when the mining shovel is in the propel mode.

17. The mining shovel of claim 14, wherein the second fluid source is a pilot pump configured to provide fluid to operate the one or more valves of the valve assembly.

18. The mining shovel of claim 17, wherein the auxiliary valve is a pilot diverter valve configured to divert fluid from the pilot pump to the hydraulic cylinder to raise the fluid pressure at the hydraulic cylinder above the second fluid pressure threshold.

19. The mining shovel of claim 17, wherein the second fluid source is configured to provide a sufficient amount of fluid to simultaneously operate the one or more valves of the valve assembly and raise the fluid pressure at the hydraulic cylinder above the second fluid pressure threshold when the mining shovel is in the propel mode.

* * * * *